INVENTORS
Albert Jaeger
Edward M. Trinder
BY Thomas A. Jenkins
ATTORNEY

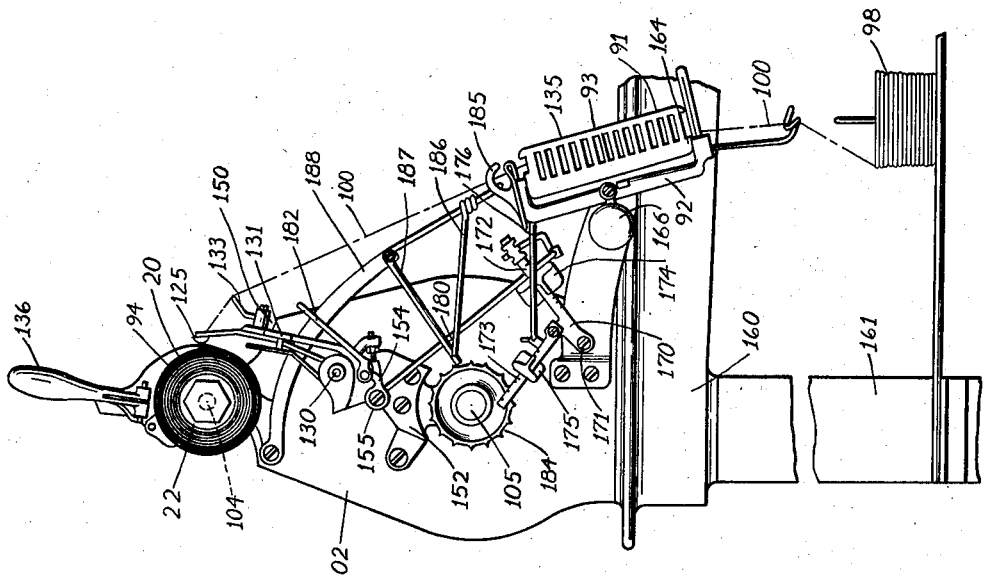
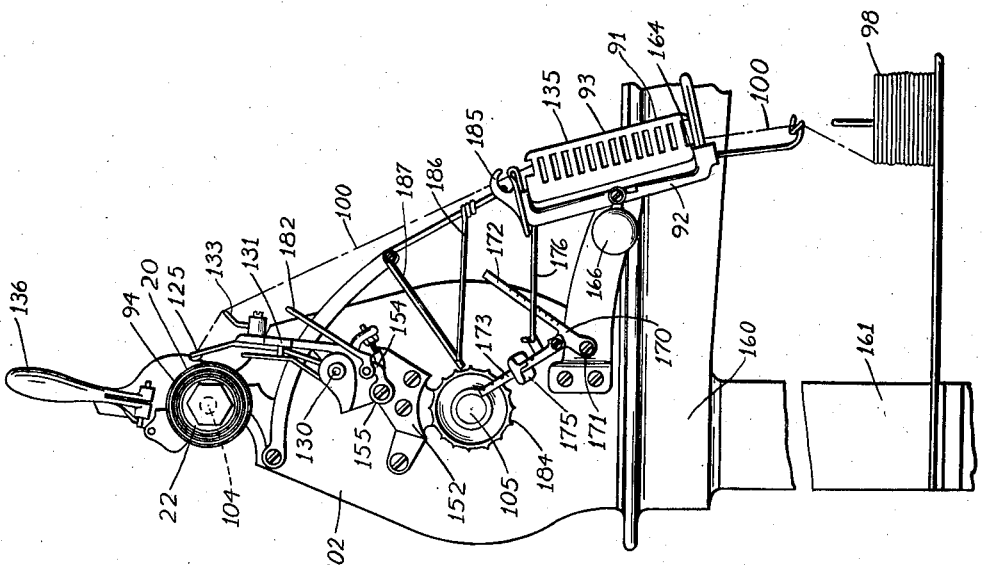

Sept. 24, 1940.  A. JAEGER ET AL  2,216,034
APPARATUS FOR TREATING RAYON
Filed Nov. 18, 1937   6 Sheets-Sheet 5

INVENTORS
Albert Jaeger
Edward M. Trinder
BY Thomas A. Jenche
ATTORNEY

Sept. 24, 1940.                    A. JAEGER ET AL                    2,216,034
                              APPARATUS FOR TREATING RAYON
                        Filed Nov. 18, 1937           6 Sheets-Sheet 6
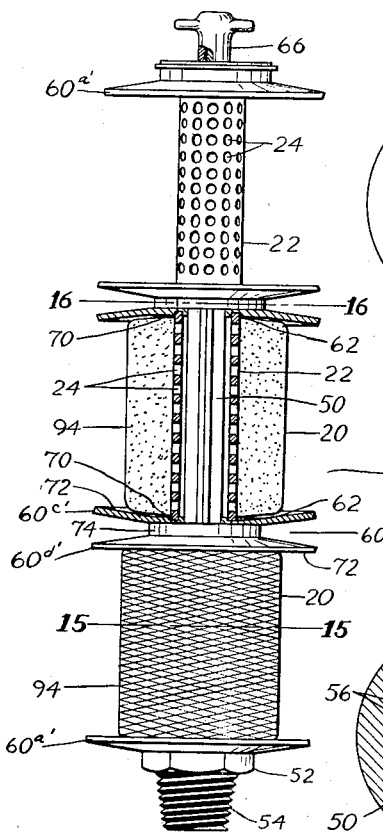
Fig. 14
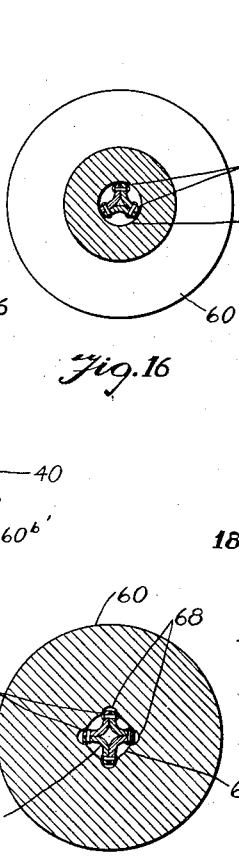
Fig. 16
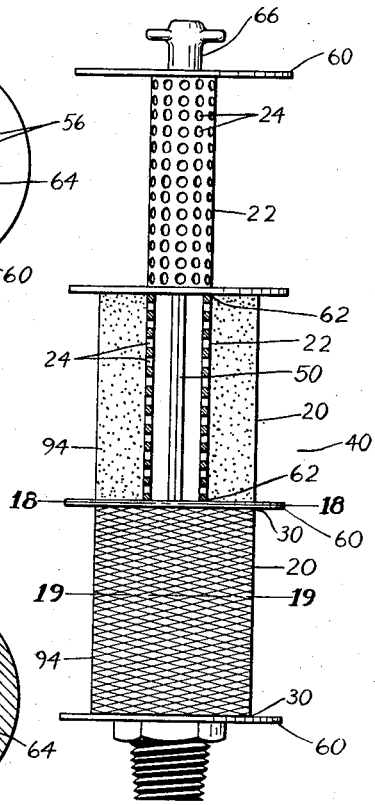
Fig. 17
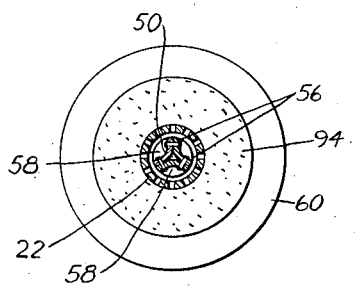
Fig. 15
Fig. 18
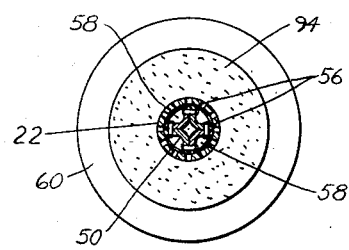
Fig. 19
INVENTORS
Albert Jaeger
Edward M. Trinder
BY Thomas A. Jenckes
ATTORNEY Patented Sept. 24, 1940

2,216,034

UNITED STATES PATENT OFFICE 2,216,034

APPARATUS FOR TREATING RAYON

Albert Jaeger, East Greenwich, and Edward M. Trinder, Greenwood, R. I., assignors to Thies Dyeing Mills, Inc., West Warwick, R. I., a corporation of Rhode Island Application November 18, 1937, Serial No. 175,256

7 Claims. (Cl. 68—198)

Our invention relates to improvements in the method of dyeing and finishing threads or yarn constructed of all types of rayon or other artificial or synthetic fibres or filaments to provide the best method yet provided for this purpose effecting substantially savings in processing, including winding, and producing less waste of yarn.

Our invention specifically relates to improvements in methods of winding rayon or other synthetic strands on perforated tubes and such duly wound rayon structures or packages, particularly adapted for use in the tube dyeing or finishing of rayon by means of radial circulation through the packages and perforated tubes and in apparatus for use in the above methods and in a novel assembly of said rayon packages, particularly adapted for use in said tube dyeing or finishing, and in the methods of and apparatus for dyeing such packages or assemblies.

Dyeing by means of radial circulation through a multiperforate tube and a strand package wound thereon has been employed in the prior art particularly for dyeing cotton, as the cotton packages, due to the fibrous and sticky nature of the spun cotton, which causes each wind of the strand to stick to adjacent winds or the winds in adjacent layers, will remain intact during the pressure they receive during such radial circulation in dyeing. Great difficulty has been experienced in applying this highly desirable method of dyeing to rayon due to the difficulty of providing a suitable rayon package which will be porous enough to permit the radial circulation therethrough and which will not become so distorted in use as to tangle the yarn due to the inherent characteristic of the extruded rayon that its outer surface is glassy and slippery.

A main object of our invention is to provide a rayon package on a perforated tube which will be porous to permit the ready radial circulation therethrough for efficient dyeing of each wind of the thread and yet a package in which the winds of the strand will remain in laid position during storage or subsequent operations or other after treatment.

A further object of our invention is to provide such a package with flat ends instead of bulging or bowed ends due to slipping which may be made substantially the length of the tube to permit the ready closing of such ends of the package without axial compression of the package itself and also to permit a greater length and weight of rayon to be wound thereon than formerly.

While the prior art has succeeded, by making yarn packages of a lesser traverse than the tube and by winding under considerable pressure, in providing a package of relatively light weight and short length which may be dyed, an object of our invention is not only to provide a package which may be more evenly dyed, but also to provide a package of greater weight than formerly thought possible even exceeding a pound, which may be evenly dyed by the radial circulation of dye liquor therethrough.

A further object of our invention is to provide an improved method of winding such a package.

The advantage of dyeing by means of radial circulation through a package wound on a perforated tube has been known in the prior art for cotton, but prior to our invention large size packages of rayon have not been economically processed of a full pound or over. Such a method is highly desirable for use in dyeing rayon as against the prior art method of skein dyeing of rayon which has resulted in a poor quality of yarn often unsalable due to tangling of the strands and broken filaments. With the tube dyeing of rayon made possible efficiently and economically by our invention, it is obvious that the only place where such broken filaments can occur will be on the outer layer of rayon on each package and thus, the liability of producing poor quality yarn or rayon in the dyeing of rayon is substantially lessened over the prior art or skein dyeing method.

A further feature of our invention is to provide a novel method of processing rayon directly from the pot spun cake, thus eliminating the preliminary winding onto the skeins, tubes or cones formerly thought necessary in tube dyeing prior to the actual perforated tube winding operations.

A further object of our invention over the prior art of perforated tube winding methods is to make it possible to wind a much larger rayon package on each perforate tube to lessen in a very considerable degree the tube cost in dyeing, which is considerable as the packages are sold to consumers on tubes which are very often not returned.

A further object of our invention is to effect savings in the later rayon processing or manufacturing operations, as due to the larger size package produced by our invention, the necessity of stoppage of machinery for doffing or otherwise changing packages is considerably diminished.

A further object of our invention is to provide a dyed rayon package suitable for further use without further rewinding as is necessary in skein dyeing, for further yarn treatment, as for instance, it is possible to wind directly into warps from said tubes or directly onto braider bobbins from said tubes.

A further object of our invention is to provide improvements in the winding apparatus to permit the winding of such an improved package thereon with the minimum amount of tension and pressure required during winding to cause the superimposed layers of spaced winds to remain in laid position without relative slippage or consequent lengthening of the package during storage and during later after treatment.

A further object of our invention is to provide improvements in the dyeing apparatus, particularly in an assembly comprising units each consisting of a plurality of superimposed yarn packages mounted on a stand pipe or spindle for the actual circulation of treating liquor through said stand pipe or along said spindle and radial circulation through the perforated tubes and their porous rayon packages, namely, an assembly in which neither the tubes, nor the means separating the ends of adjacent packages may get out of vertical alignment or become relatively rotated during the dyeing operation and in its preferred form and assembly one which may be conveniently and readily assembled outside of the dyeing keir or vat.

These and such other objects of our invention as may hereinafter appear will be best understood from a description of the accompanying drawings, which illustrate various embodiments thereof.

In the drawings, Fig. 1 is a side elevation of a structure for use in dyeing or finishing rayon comprising a multiperforate tube and a rayon strand wound thereon in a porous package constructed in accordance with our invention with one end of the package being broken away to show the tube structure.

Figure 5:
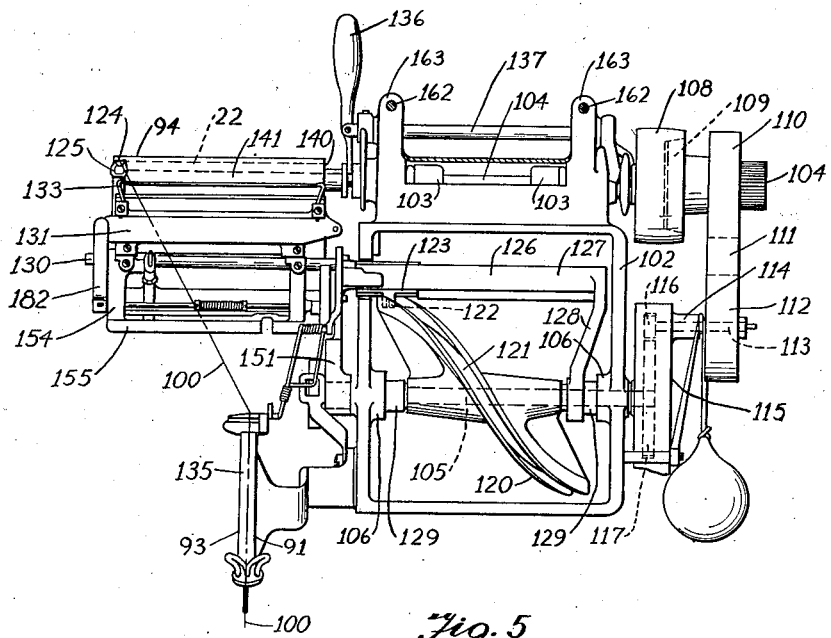

Fig. 5 is a side elevation of a standard type of winding machine in which the spindle for rotating the tube is driven at constant R. P. M., modified to carry out our invention.

Figure 6:
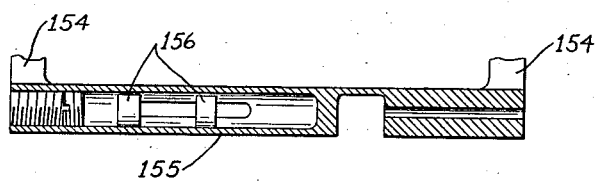

Fig. 6 is a longitudinal sectional view taken through the balancing tube thereof.

Figure 7:
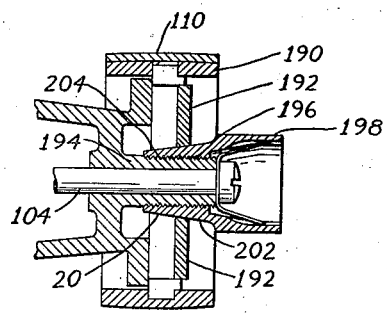

Fig. 7 is a longitudinal sectional view taken through the type of adjustable pulley normally employed in such a machine in which the circumference thereof may be varied to vary the traverse of the winds of strands on each perforated tube.

Fig. 8 is a front elevation of such a standard type of winding machine modified to exert a minimum amount of tension and pressure on the wound strand to wind a package in accordance with our invention.

Fig. 9 is a front elevation of a standard type of such a machine modified to exert a lesser amount of tension and pressure on the strand while being wound than formerly thought possible, but not as small as in the improved embodiment of our invention shown in Figs. 5-8.

Figure 10:
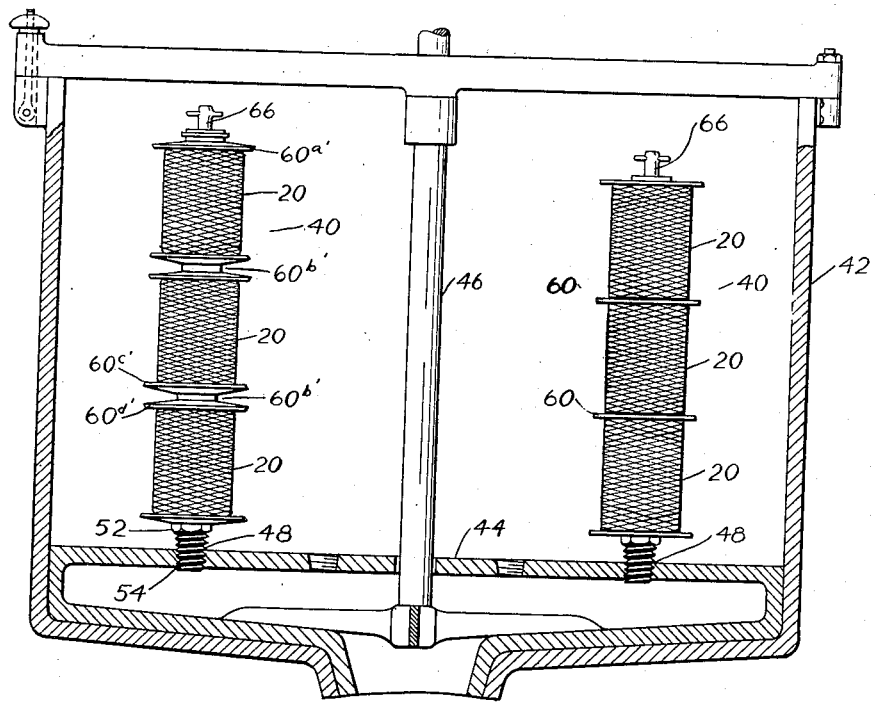

Fig. 10 is a sectional view taken through a dyeing vat of the open type in which a plurality of assemblies of units for dyeing a plurality of superimposed yarn packages wound in accordance with our invention may be employed and illustrating improvements in the assembly structure characteristic of our invention.

Figure 11:
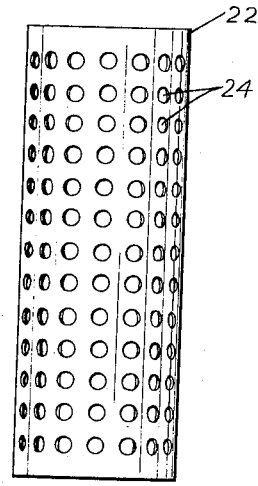

Fig. 11 is a side elevation of a perforate tube suitable for the winding of our improved package thereon and used in our improved assembly for dyeing shown in Fig. 10.

Figure 12:
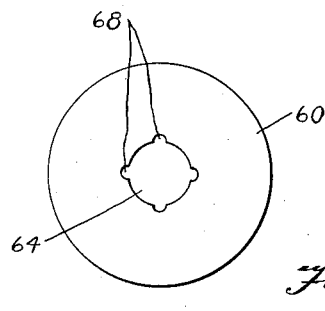

Fig. 12 is a plan view of a centrally perforate separating plate means which may be used in the embodiment of our invention shown in Figs. 17–19.

Figure 13:
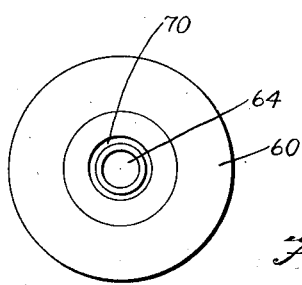

Fig. 13 is a plan view of a modified form of a centrally perforate intermediate separating plate means provided with concave outer surfaces which may be employed in the embodiment of our invention shown in Figs. 14–16.

Fig. 14 is a side elevation of an assembly of superimposed yarn packages constructed in accordance with one embodiment of our invention employing one type of separating plate showing the lower package in elevation, the intermediate package and apparatus in section and the structure for holding the upper package in elevation with said package removed.

Fig. 15 is a cross sectional view taken along the line 15—15 of Fig. 14.

Fig. 16 is a cross sectional view taken along the line 16—16 of Fig. 14.

Fig. 17 is a side elevation similar to Fig. 14 of the preferred embodiment of our invention employing our preferred type of separating plate means.

Fig. 18 is a cross sectional view taken along the line 18—18 of Fig. 14.

Fig. 19 is a cross sectional view taken along the line 19—19 of Fig. 14.

In the drawings, wherein like characters of reference indicate like parts throughout, 20 generally indicates a structure for use in dyeing or finishing rayon constructed in accordance with our invention. Said structure comprises a standard type of multiperforate tube 22 in which the perforations 24 thereof are preferably arranged in vertical and horizontal rows as is common in the art. My improved rayon package 94 comprises a rayon strand 100 wound in a multiplicity of layers 26 of spaced oblique winds 28 on said tube with the winds of each successive layer arranged in obliquely opposite directions but with each successive two layers 26$^a$ and 26$^b$ etc. of obliquely opposite winds 28$^a$ and 28$^b$ etc. substantially relatively overlapping and underlapping each other to produce in effect a single composite layer. The superimposed winds 28$^a$ and 28$^c$, etc. of alternate successive layers 26$^a$ and 26$^c$, etc. thus extend obliquely in the same direction and are substantially parallel and in my preferred embodiment, the winds 28$^c$ and 28$^e$ of the lower layers 26$^c$ and 26$^e$ etc. are only slightly successively offset from the respective winds 28$^a$ and 28$^c$, etc. in the respective similarly wound alternate layers 26$^a$ and 26$^c$, etc. above them. It is apparent that the oblique winds 28$^b$ and 28$^d$, etc. in the alternate layers 26$^b$ and 26$^d$, etc. travel obliquely in the opposite direction and that the winds 28$^d$ and 28$^f$, etc. of the alternate similarly wound successive layers 26$^d$ and 26$^f$, etc. will be substantially parallel with and preferably in our preferred embodiment successively only slightly offset from the winds 28ᵇ and 28ᵈ, etc. of the layers 26ᵇ and 26ᵈ, etc. above them. Such a wind is produced on the standard type of Universal Winding Co.'s No. 50 winding machine in which the spindle rotates at constant R. P. M. and is the inevitable result of winding on such a spindle with a uniform rate of traverse. Such a wind provides successive diamonds formed by the respective composite layers made up of the overlapping and underlapping sets of obliquely oppositely wound layers 26ᵃ and 26ᵇ, 26ᶜ and 26ᵈ, etc. Our preferred package 94 is preferably wound with a traverse substantially the length of the tube to provide the porous rayon package 94 having substantially parallel ends 30, said package 94 being preferably of substantially the length of the tube 22 and said rayon strand 100 being wound only with sufficient tension and pressure to cause said superimposed layers 26 of spaced winds 28 to remain in laid position without relative slippage with consequent lengthening of the rayon package during storage and during later dyeing or finishing thereof by radial circulation through the perforations of said tube and the spacings 32 between winds in said porous package 94. Our invention also includes such a package after it has been dyed or finished which will remain in substantially the same position for sale in dyed form to the customer for further winding or processing.

Figure 1:
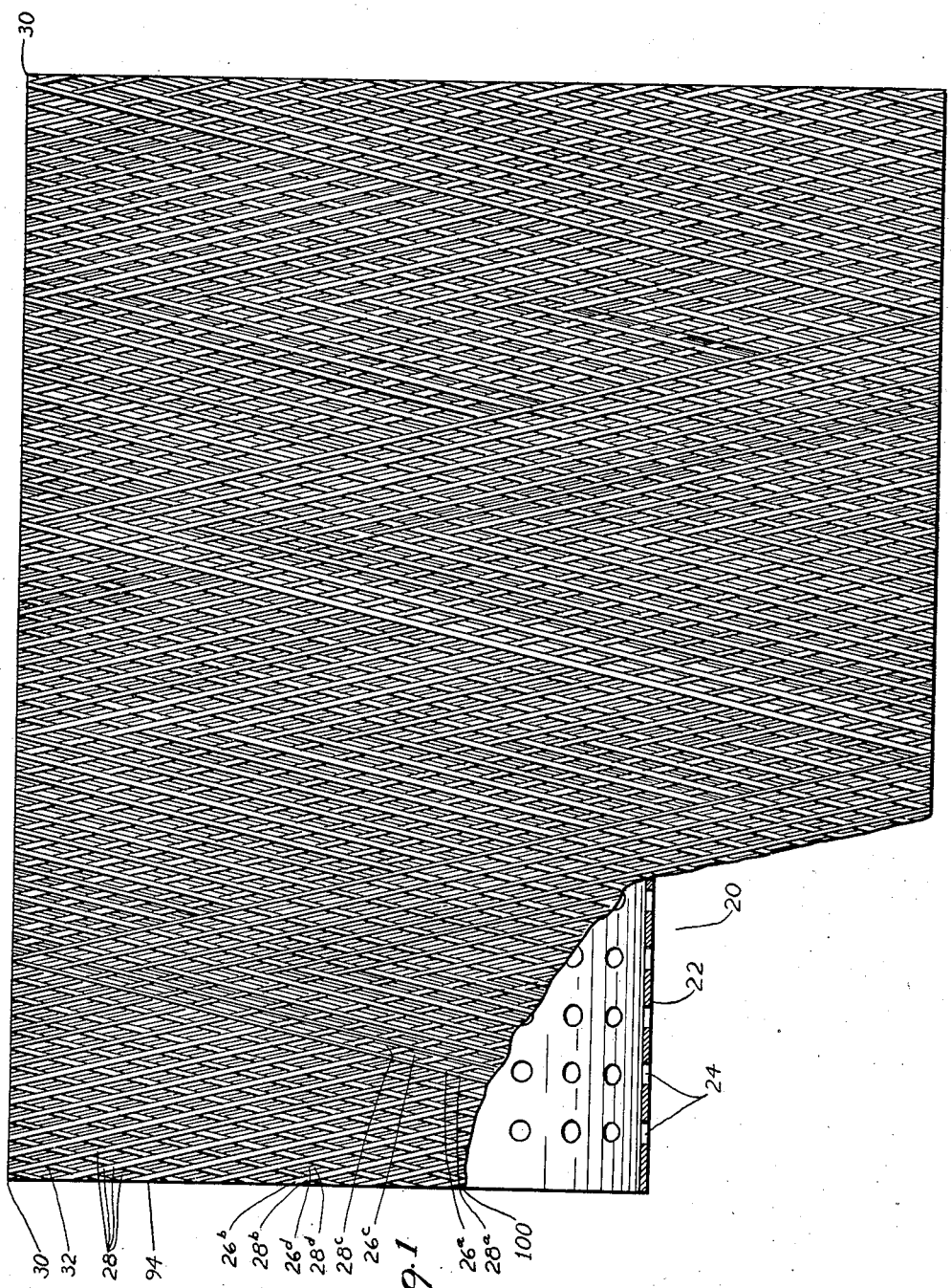
Figure 2:
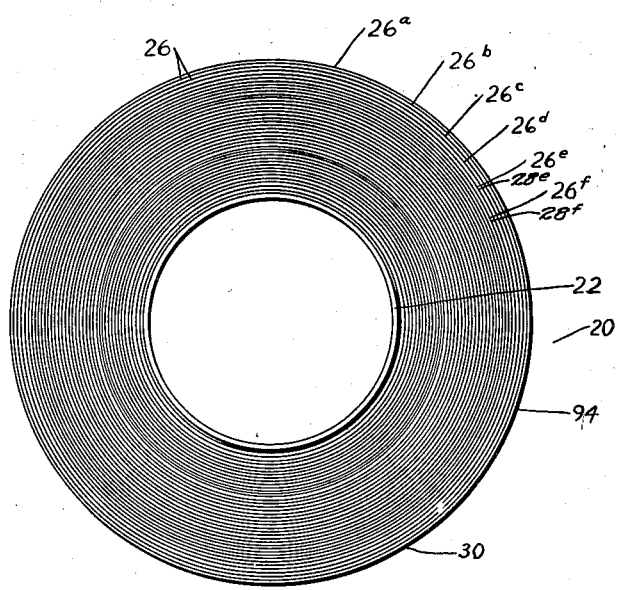
Fig. 2 is a reduced end view of the improved package shown in Fig. 1.
Figure 3:
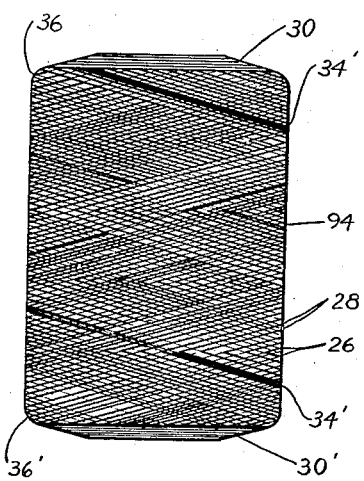
Fig. 3 is a side elevation of a former type of smaller package as large as it has been possible to wind and successfully dye in the prior art, but wound under such tension and pressure that in use the winds of rayon yarn have slipped to bulge out the ends and become in spots adjacent to each other to not provide a porous structure at these points.
Figure 4:
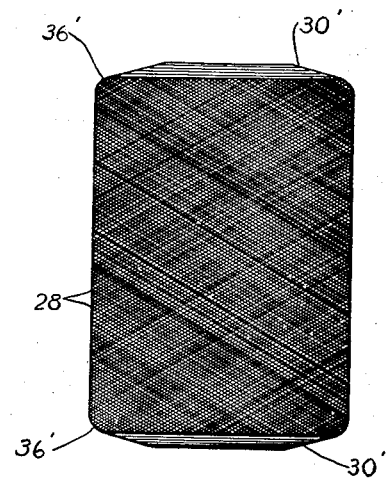
Fig. 4 is a side elevation of a former type of package in which each wind lies adjacent to its adjacent wind and thus in which each wind is not so spaced as to provide a porous structure suitable for dyeing.

We have shown in Fig. 3 a prior art type of package 94 which has been wound under considerably more tension and pressure than our improved package, but in which attempts were made to space the threads. It is apparent that the pressure exerted on the strand during winding or during storage or after later treatment has caused the winds 28 in each respective layer 26 to slip relative to each other to form the relatively solid portions 34' therein at points thereof in which each wind is substantially adjacent to its adjacent wind to prevent the free lateral flow of treating liquor therethrough at these solid points 34' for uniform dyeing and in which the relative layers 26 of winds 28 have relatively slipped in addition to cause the bulged out frustro-conical ends 30' and rounded corners 36', it being noted that in our improved package shown in Fig. 1 the corners thereof are approximately rectangular. A package of the type shown in Fig. 3 has been usually wound with the traverse of the strand of lesser length than the length of the tube to allow for this slippage and winding a rayon package under such pressure and tension, such slippage has been inevitable. This has proven unsatisfactory in the tube dyeing of rayon in a manner hereinafter indicated as the separator plates 60 for the ends of each yarn package have been unable to compactly abut the flat ends of the package often causing greater dyeing on the conical ends 30' of such a package, as shown in Fig. 3 than through the porous cylindrical body. We have shown in Fig. 4 a type of package wherein the winds 28 are substantially adjacent throughout and which is hardly porous in a manner to permit ready tube dyeing.

As stated, our invention also includes improvements in the art of dyeing or finishing rayon, which comprise, winding a rayon strand 100 directly from a pot spun cake 98, or other source of rayon supply onto a multiperforate tube 22 rotating at a constant R. P. M. in a multiplicity of layers 26 of spaced oblique winds 28 with the winds 28 in superimposed alternate successive layers substantially parallel and preferably with a traverse substantially the length of the tube 22, under only sufficient tension and pressure to cause said superimposed layers 26 of spaced winds 28 to remain in laid position during storage and later dyeing or finishing without relative slippage and consequent lengthening of said package.

We have found in practice that the pressure and tension on the wound strand can only be satisfactorily regulated on a type of machine employing a spindle to rotate the multiperforate tube at a constant R. P. M. While any suitable make or kind of this species of winding machine may be employed, however, we have illustrated in the drawings, a machine of this type constructed by the Universal Winding Company of Cranston, R. I., adjustable to accomplish our improved method and wind, our improved package and such apparatus as patentably modified by us is shown in Figs. 5 and 8 for carrying out our invention. Such a winding machine comprises a main frame 102 of box-like construction with opposite bearings 103 at the top in which is journaled a shaft 104, usually termed "the winding spindle." Arranged below and parallel with the winding spindle 104 is a cam shaft 105 journaled in bearings 106 at the side of the frame 102. The spindle 104 constitutes the drive shaft of the machine, being driven from a belt pulley 108 adapted to be connected therewith through a clutch member 109 fast on the shaft 104. The clutch member 109 is integral with the belt pulley 110 which is connected by a belt 111 to a similar pulley 112 located therebelow. The pulley 112 is fast with and drives a shaft 113 journaled in the bearing 114 in a casing 115 at the side of the main frame 102. At its inner end the shaft 113 carries a pinion 116 meshing with the gear 117 on the cam shaft 105.

Fast on the cam shaft 105 is a cam 120 having a helical groove 121 in its periphery. The groove 121 is engaged by a roller or follower 122 on a slide or cross-head 123, which constitutes the means for reciprocating the thread guide 125. The cross head 123 is slidable on the guide-way in a traverse frame 126 constituted by the horizontal bearing 127 supported from legs 128 pivoted on bushings 129, which serve as the journals for the cam shaft 105. Connected at one end of the cross head 123 is a traverse rod 130 carrying the thread guide 125 at its outer end. The traverse rod 130 slides in the guide-way in the traverse frame 126 and the thread guide 125 bears against a pressure plate 131 mounted to pivot therewith to adapt it to traverse back and forth in parallel relation to the axis of the winding spindle. The thread guide 125 is notched at 124 to receive the yarn and a thread bail 133 mounted on the pressure back plate 131 extends horizontally at the rear of the guide. An adjustable tension device, shown generally at 135 in Fig. 5 is supported from the frame 102 of the machine and arranged to adapt the yarn to draw therethrough as it leads up from its source of supply. From the tension device 135, the yarn draws upwardly across the thread bail 133 and is fed through the notch 124 in the guide 125 as it is wound on a perforated dyeing tube or bobbin 22.

The operation of the winding machine is controlled by a starting lever 136 acting through a rod 137 to disengage the driving pulley 108 from the clutch pulley 109 and automatically operated means later to be described are provided for arresting the winding when the yarn breaks or the package reaches a predetermined diameter.

As hereinbefore indicated the present device is adapted to wind the package 94 on a perforated dyeing tube 22 of cylindrical shape. The tube or bobbin 22 is rotated from a driving shaft or winding spindle 104 being carried on a sleeve or hollow mandrel 140 rigidly mounted on an extension 141 of the spindle 104. The present type of winding machine is usually constructed in separate units mounted on a table or bed 160, which is supported from the floor by legs 161. The several aligned heads or winding units are connected at the top by a pair of horizontal tie-rods 162 passing through lugs 163 integral with the frame 102.

The machine shown in Figs. 5-9 is a modification of a standard type of "Universal" winding machine of the general type described in patents No. 2,002,572 and 1,966,159. The device shown in Fig. 9 shows such a machine equipped with a novel type of so-called "Ray-Silk" attachment, which is not believed patented, which attachment includes a modification of a standard type of device to apply a lesser amount of pressure for rayon or silk than the weighted pressure devices formerly thought necessary for winding cotton as shown in said patents. In the prior art the traverse or pressure back plate 131 was mounted on a bracket 152 rigidly mounted on a bracket 151 pivotally mounted on the front end of the cam shaft 105. In the "Ray-Silk" attachment, the bracket 152 and attached bracket 151 are rigidly mounted on the frame 102 and the pressure back plate 131 and other associated parts of the pressure back assembly 150 hereinafter referred to as the pressure back, including said plate 131, traverse rod 130, and guide 125 are independently pivotally mounted on the bracket 152 on the traverse rod 130 as a pivot. Depending from the pressure back plate 131, as bracket 152 on the traverse rod 130 as a pivot, shown in Fig. 6 by means of the curved arms 154 curved towards the opposite side of the pivot traverse rod 130 from the parts of the pressure back heretofore referred to is mounted a balancing tube 155 adapted to receive selected weighting slugs 156. It is thus obvious that by increasing the number of slugs 156 in the tube 155 may the weight of the pressure back including particularly the guide 125 against the tube 22 and package 94 being wound thereon be adjustably varied. By independently mounting the pressure back 150 on the bracket 152, the size thereof may be correspondingly decreased so as to substantially lessen the weight of the parts thereof and hence pressure brought to bear by the guide 125 pressing against the tube 22 and package 94 being wound thereon.

The standard type of "Ray-Silk" attachment is shown in Fig. 9, the tension device 135 comprising two tension plates, one 91 being rigidly mounted on a vertically extending frame 92 and the other outer one 93 as shown in Fig. 5 being pivotally mounted on a rod 164 vertically mounted on said frame 92. The adjustable pivotally mounted tension plate 93 is provided with a tension closing device 166 adapted to close said pivoted tension plate 93 to cause it to bear against the stationary plate 91. A lever 170 is pivotally mounted on a pivot rod 171 projecting laterally from the frame 102. At a short distance away from its pivot, said lever bifurcates into two oppositely inclined arms, namely, the pressure arm 172 projecting obliquely towards the tension device 135 and the tension arm 173 pivotally mounted on said lever projecting obliquely in the opposite direction. Each of said arms 172 and 173 is provided with suitable notches to adjustably receive lugs projecting from the interior of the tubular weights 174 and 175 respectively on said arms to respectively vary the amount of pressure and tension applied to the respective pressure back 150 and movable tension plate 93 of the pressure device 135. A rod 176 is attached to the movable tension plate 93 and is permanently attached to the tension arm 173 and it is thus obvious that by varying the position of the weight 175 on the tension arm 173 of said lever 170 may the weight applied to said movable tension plate 93 be adjustably varied to vary the amount of tension applied by the movable tension plate 93 to the strand 100 passing upwardly between it and the stationary plate 91.

As stated hitherto, the pressure back 150 including the pressure plate 131 is pivotally mounted on the traverse rod 130 mounted on the bracket 152 and the guide 125 traverses relative to said pressure back plate 131 in the manner hitherto described, the balancing tube 155 being mounted on the opposite side of the pivot 130 from the pressure back 150. An arm 180 has its upper end pivotally mounted on the balancing tube 155 and its lower end pivotally mounted on the end of the adjustable pressure arm 172 of the lever 170 and it is thus obvious by varying the position of the weight 174 on said pressure arm 172, may the pressure applied by the guide 125 against the tube 22 or package 94 being wound thereon be adjustably varied. The release bar 182 for the pressure back 150 is pivotally mounted underneath said pressure back 150.

As also shown in Figs. 8 and 9, said winding device is also provided with a suitable mechanism to stop the operation of the winding machine on breakage of the strand and for this purpose includes the stopping lever cog-wheel 184 independently mounted on the end of the cam shaft 105. A tension finger 185 is pivotally mounted on the stationary tension plate 91 adapted to pivot downwards when there is no strand passing therethrough to force the arm 186 attached thereto against a cog in the cogwheel 184 to pivot an arm 187 to release the clutch actuating arm 188 to actuate the clutch lever 136 and driving pulley 108 away from the clutch 109 to stop the rotation of the spindle to stop the winding operation.

To vary the speed of traverse of the cross head 123 and the guide 125 actuated thereby relative to the R. P. M. of the spindle 104, the pulley 110 may be of an adjustable type, as more fully illustrated in Fig. 7 to vary the operative circumference thereof. Said pulley 110 is provided with a split rim 190 which is supported by the four radially adjustable spokes or pins 192. A sleeve 194 is rigidly mounted to rotate with the shaft 104 and has the outer portion thereof externally threaded as at 196. An adjusting nut 198 having an inner end 20 having an inwardly tapered outer periphery 202 and an internally threaded inner periphery 204 is provided adapted to be threaded on the threaded outer end 196 of said sleeve 194 and its conical inwardly tapered outer end adapted to abut the inner ends of the spokes 192 to force the split rim 190 relatively outwardly to relatively increase or decrease the effective circumference of the split rim 190 and hence pulley 110 for the above purpose.

The embodiment shown in Figs. 5 and 8 provides an improvement over the so-called "Ray-Silk" attachment of the Universal Winding Co. shown in Fig. 9 wherein the pressure back connecting arm 180 for the lever 170 is omitted to provide an even lesser amount of pressure than provided by said "Ray-Silk" attachment. In this device, the amount of pressure is entirely regulated by means of the slugs 156 heretofore described so that the pressure applied by said pressure back 150 can be accurately reduced almost to zero. With the pressure back connecting rod 180 removed and the adjustable tubular pressure weight 174 also removed, it is obvious that the pressure lever arm 172 may be raised towards the vertical, thereby automatically raising the tension lever arm 173 also towards the vertical. It is then obvious that with the tension lever arm 173 only slightly offset from the vertical, very fine tension adjustments may be made by varying the position of the tubular tension weight 174 on its respective tension arm 173 as shown. If desired, by means of this modification, the tension applied can be reduced almost to zero.

The operation of either device is identical, the clutch is connected to rotate the spindle 104 and tube mandrel 141 and tube 22 mounted thereon. The belt 111 drives the pulley 112 to actuate the cam shaft 105 to reciprocate the cross head 123 and hence traverse the guide 125. The strand 100 may thus be led from the pot spun rayon cake 98 or other source of rayon supply employed upwards between the blades of the tension device 135 through the guide 125 and onto the perforate tube 22 or other holder to form the rayon package 94. The tension applied to the strand in the embodiment shown in Fig. 9 may be adjustably varied by varying the position of the tension weight 175 and the pressure applied against the wound rayon package 94 by the guide 125 may be varied by varying the position of the pressure weight 174. In the embodiment shown in Figs. 5 and 8, however, the pressure may be varied by varying the number of slugs 156 and the tension may be easily varied by varying the position of the weight 175 on its tension arm 173. The relation between the R. P. M. of the spindle 104 and attached tube 22 and package 94 being wound thereon and the traverse of the guide 125 may be varied in the manner hitherto explained by varying the effective circumference of the split rim 190 of the pulley 110.

It is obvious that in the earlier types of Universal machines employing a spindle rotating at constant R. P. M., that the peripheral speed of the package 94 being wound thereon increases as the package 94 increases in size so that in the prior art it has been thought necessary to employ the lever 170 to provide decreasing pressure and tension on the strand 100 as the package 94 increases in size. In our preferred embodiment, however, so little pressure and tension is required that it is possible to eliminate the pressure lever arm 180 and adjust the tension in the simple manner hitherto described.

We have illustrated the winding machines shown in Figs. 5-9 only for the purpose of showing a type of a machine on which our invention may be successfully carried out. While it is possible to so reduce the tension and pressure in the machine shown in Fig. 9 by the adjustment of both pressure and tension to their substantial minimums contrary to the teachings of the prior art, we have attained better results if the amount of pressure and tension may be further lessened by the elimination of the relatively heavier parts shown in Fig. 9 to the simpler, more easily adjustable parts shown in Figs. 5 and 8, in which all adjustments are of lighter weight and intensity.

As stated hitherto, the machines illustrated in Figs. 5-9 are merely typical machines on which our improved winding method may be practiced and it is apparent that other types of machines radically different from the illustrated machines shown herein may be employed to make our improved package and structure and to carry out our improved method.

As stated hitherto, our invention further comprises the additional step of dyeing or finishing a rayon package constructed in accordance with our invention and by our improved method by circulating the treating liquor for the requisite amount of time radially and if desired alternately inwardly and outwardly through the medium of a reversible flow pump or a suitable valve mechanism for a unidirectional flow pump, through the perforations 24 in said tube 22 and spaces 32 between the winds 28 in said porous packages 94. While our improved package may be dyed as a single unit, for economically dyeing or otherwise treating a plurality of said packages we preferably provide an assembly of tubes and packages. A plurality of the tubes and packages are preferably arranged in superimposed alignment into units 40 with separators 60 inserted between the ends of adjacent packages 94 in each unit 40 to abut the ends of said tubes to prevent the threads of adjacent packages from contact with threads of adjacent packages during treatment and thus with individual packages of the units confined at the ends thereof by said separators, and our invention further relates to improvements in such a unit assembly for use in dyeing or otherwise processing rayons and similar fibrous materials.

As shown in Fig. 10, a plurality of such units 40 of 40 may be dyed in a suitable vat 42, either of the open type or of the closed type. In the improved type of keir or vat shown, said keir 42 is preferably provided with a perforate false bottom 44 to which a suitable standard 46 may be attached which may be suitably clamped in position within the keir in any suitable manner in a manner to permit said false bottom 44 to be completely removed from the keir for loading purposes if desired. Said false bottom 44 is also preferably provided with a preferably circular series of internally threaded holes 48 for receiving our improved units 40 therein. Thus each unit constructed in accordance with our invention may comprise an elongated spindle 50 having a collar 52 on its lower end externally threaded as at 54 for threaded engagement in a respective threaded hole 48 in said false bottom 44 for mounting on the hollow base or false bottom 44 adapted to be inserted within the keir or dyeing vat and removable after use for loading and unloading purposes. Insofar as the other structural features of our invention are concerned, however, the spindle 50 may be detachably or permanently mounted within the keir in any suitable manner.

While, for carrying out the broader features of our improved method, said spindle, 50 may comprise, any suitable type of a spindle even a perforated stand pipe, in accordance with a feature of our invention, said spindle is preferably provided with a plurality of circumferentially spaced ribs 56 extending substantially throughout the height thereof providing spaced continuous channels for the free passage of treating liquor axially of said spindle. For this purpose, said spindle may comprise a plurality of angle bars suitably joined together or may be constructed in any suitable manner with any desired number of ribs to form the desired number of spaced axial channels. A plurality of the perforated yarn holding tubes 22 are mounted in superimposed relationship on said spindle to permit the passage of liquor from said axial channels 58 radially through the perforations 24 in said tubes. In the embodiments illustrated in Figs. 14–19, we employ as the separators perforate plate means 60 slidably mounted on said ribs at least one surface thereof abutting an end 62 of a perforated tube 22 to separate the yarn packages 94 mounted on said tubes.

In addition, we provide means to axially compress said separator plate means 60 and tubes 22 to provide a rigid structure with said ribs 56 abutting the central holes 64 in said plate means and the ends 62 of said tubes abutting the surfaces of said plate means 60, in the embodiment shown comprising an internally threaded hollow nut 66 threadedly adjustable on the threaded upper end of the spindle 50. A characteristic feature of our improved assembly is the provision of a spindle having the axially spaced ribs 56 of a length to continuously abut the inner walls of said superimposed tubes to retain said tubes in alignment and against rotation and in the embodiment of our invention shown in Figs. 14–16 the inner walls of the holes 64 in said plate means 60 to also retain said plate means 60 in alignment and against rotation.

While any suitable type of a rayon package may be wound on each superimposed tube 22 in each respective unit 40, for the reasons hitherto given, we preferably employ a rayon package 94 wound in accordance with our improved method and structure hitherto described on each respective superimposed tube. With a package constructed with the substantially flat ends 30 in accordance with our invention, it is obvious that a flat plate 60 is the best type of separating means to be employed which will firmly contact the ends 30 of each package, which as stated, is preferably substantially the length of each respective tube 22 to seal each respective end of said package 94 and to prevent the ends of adjacent packages from contact during treatment and for this purpose where our improved type of package hitherto described is employed, we preferably employ the type of separator plate 60 shown in Figs. 17–19 comprising a flat single layer provided with a centrally perforated hole 64. In addition, to supplementally secure said plates 60 in alignment and against rotation on said spindle 50, we preferably provide the central holes 64 of said plates with spaces slots 68 extending outwardly from said central perforations 64 for receiving the ribs 56 for securing said plate 60 against rotation.

If, however, it be desired to employ our improved assembly apparatus for use in dyeing former types of packages, such as shown in Fig. 3 often provided with conical ends, the type of separator plate shown in Figs. 15 and 16 may be employed. Said plates may then be constructed of two different types, such as the plate 60ᵃ' for the upper and lower ends of said spindle centrally perforated as at 64 slidably mounted on said ribs having circular grooves 70 for receiving respective ends of the adjacent perforated tubes and if a package having a conical end be employed, said plate means may have a concaved surface 72 for contacting the respective convex or conical end of said poorly wound package and intermediate separating plate means 60ᵇ' may be provided comprising spaced plates 60ᶜ' and 60ᵈ' provided with concave outer surfaces 72 if desired, having the central grooves 70 for receiving the respective ends of adjacent perforated tubes 22 and sleeves 74 having their interior surfaces adapted to slidably abut said ribs 56 joining the inner ends of said spaced plate means 60ᶜ' and 60ᵈ' together to separate the ends of adjacent yarn packages mounted on said tubes.

While both species of assembly, namely, that shown in Figs. 14–16 and at the left hand side of Fig. 10 and the species shown in Figs. 17–19 and at the right hand side of Fig. 10 may be employed, it is obvious that where our improved packages 94 are employed, the specific embodiment shown in Figs. 17–19 is preferred as it is not only simpler, but surer in its action to maintain the tubes and plate means 60 in alignment and against relative rotation on the ribs 56 of the spindle 50.

It is apparent therefore that we have provided a composite method of dyeing or finishing rayon, which comprises winding the individual rayon packages 94 in the manner hitherto explained and dyeing or finishing said rayon packages by circulating the treating liquor for the requisite amount of time radially and if desired alternately inwardly and outwardly through the perforations 24 of said tubes and spaces 32 between the winds in said porous packages and if desired for ease of treatment, arranging a plurality of said tubes and packages in superimposed alignment in units, inserting separators between the ends of adjacent packages in each unit to abut the ends of said tubes to prevent the threads of adjacent packages from contact during treatment, confining the packages of each unit at the ends thereof by means of the concave or flat plates 60ᵃ' or 60ᵇ' or 60 as hitherto described and then dyeing said units by radial circulation of the treating liquor as aforesaid. We have attained best results, however, by employing our improved structure of package on the improved structure of assembly unit shown in Figs. 12–19, in which the spaced ribs abut the interior of the tubes to maintain the tubes in alignment and against rotation and either the interior of the holes 64 in the plate means 60 or the slots 68 projecting radially outwardly from said holes 64 to more positively secure said plate means in alignment and against relative rotation and in an assembly wherein the ends of the packages are suitably confined for uniform radial circulation therethrough by means of the concave surfaces adjacent the ends of the packages or the flat surfaces abutting the flat ends of our improved packages where employed.

It is thus apparent that we have provided an improved type of assembly for dyeing or continuously treating rayon, which not only includes our improved type of unit for use in the dyeing apparatus by means of radial circulation through the package, but also said unit for better results with our improved type of porous yarn package mounted on the tubes thereof.

It is thus apparent that we have provided a novel type of method for winding rayon and such a winding method in combination with a radial circulation dyeing method and improved apparatus and package structure for use both in winding and dyeing of rayon with the advantages described above.

We employ the word "rayon" in the claims to include any type of a synthetic yarn or thread, whether composed of continuous twisted filaments, such filaments cut and spun into thread or yarn or otherwise.

It is understood that our invention is not limited to the specific methods, structures and apparatus shown and that various deviations may be made therefrom without departing from the spirit and scope of the appended claims.

What we claim is:

1. A structure for use in dyeing or finishing rayon, comprising a multiperforate tube, and a textile strand wound in a multiplicity of layers of spaced oblique winds on said tube with the superimposed winds of alternately successive layers substantially parallel, but slightly successively offset throughout the mass thereof and with a traverse substantially the length of said tube to provide a porous rayon package having substantially parallel ends substantially of the length of the tube, said textile strand being wound under only sufficient tension and pressure to cause said superimposed layers of spaced winds to remain in laid position without relative slippage and consequent lengthening of the textile package during storage and during later dyeing or finishing thereof by radial circulation through the perforations of said tube and the spaces between the winds in said porous package.

2. A structure for use in dyeing or finishing rayon, comprising a multiperforate tube, and a textile strand wound in a multiplicity of layers of spaced oblique winds on said tube with the superimposed windings of alternately successive layers substantially parallel, but slightly successively offset throughout the mass thereof to provide a porous textile package having substantially parallel ends, said textile strand being wound under only sufficient tension and pressure to cause said superimposed layers of spaced winds to remain in laid position without relative slippage and consequent lengthening of the textile package during storage and during later dyeing or finishing thereof by radial circulation through the perforations of said tube and the spaces between the winds in said porous package.

3. A new article of manufacture, comprising a multiperforate tube, and a porous rayon package wound thereon comprising a multiplicity of layers of spaced oblique winds of a rayon strand with the superimposed winds of alternately successive layers substantially parallel but slightly successively offset, said package having substantially parallel ends and being of substantially the length of said tube.

4. A new article of manufacture, comprising a multiperforate tube, and a porous rayon package wound thereon, comprising a multiplicity of layers of spaced oblique winds of a rayon strand with the superimposed winds of alternately successive layers substantially parallel but slightly successively offset, said package having substantially parallel ends.

5. An assembly for use in dyeing or otherwise processing rayon and similar fibrous materials comprising an elongated spindle having means on the lower end thereof for mounting on a hollow base adapted to be inserted within a keir or dyeing vat, spaced ribs extending substantially throughout the height thereof providing spaced continuous channels for the free passage of liquor axially of said spindle, a plurality of perforated yarn holding tubes mounted in superimposed relationship on said spindle having the interior thereof rigidly abutting said ribs to permit the passage of liquor from said axial channels radially through the perforations thereof, plates centrally perforated to be slidably mounted on said ribs having surfaces for the abutment of the adjacent ends of the perforated tubes thereon and spaced slots extending radially outwardly from said central perforations for receiving said ribs for securing said plates against rotation to separate the yarn packages mounted on said tubes and means to axially compress said plates and tubes to provide a rigid structure with said ribs abutting the slots in said plate means and the ends of said tubes abutting the surfaces of said plate means.

6. An assembly for use in dyeing or otherwise processing rayon, comprising an elongated spindle having means on the lower end thereof for mounting on a hollow base adapted to be inserted within a keir or dyeing vat, spaced ribs extending substantially throughout the height thereof providing spaced continuous channels for the free passage of liquor axially of said spindle, a plurality of perforated yarn holding tubes each having a porous rayon package wound thereon comprising a multiplicity of layers of spaced oblique winds of a rayon strand with the superimposed winds of alternately successive layers substantially parallel but slightly successively offset, said package having substantially parallel ends and being of substantially the length of said tube, wound under only sufficient tension and pressure to cause said superimposed layers of spaced winds to remain in laid position without relative slippage and consequent lengthening of the rayon package during dyeing or finishing thereof mounted in superimposed relationship on said spindle having the interiors thereof rigidly abutting said ribs to permit the passage of liquor from said axial channels radially through the perforations thereof, plates centrally perforated to be slidably mounted on said ribs having surfaces for the abutment of the adjacent ends of the perforated tubes thereon and spaced slots extending radially outwardly from said central perforations for receiving said ribs for securing said plates against rotation to separate the yarn packages mounted on said tubes and means to axially compress said plates and tubes to provide a rigid structure with said ribs abutting the slots in said plate means and the ends of said tubes abutting the surfaces of said plate means.

7. An assembly for use in dyeing or otherwise processing rayon comprising an elongated spindle having means on the lower end thereof for mounting on a hollow base adapted to be inserted within a keir or dyeing vat, spaced ribs extending substantially throughout the height thereof providing spaced continuous channels for the free passage of liquor axially of said spindle, a plurality of perforated yarn holding tubes each having a porous rayon package wound thereon comprising a multiplicity of layers of spaced oblique winds of a rayon strand with the superimposed winds of alternately successive layers substantially parallel said package having substantially parallel ends wound under only sufficient tension and pressure to cause said superimposed layers of spaced winds to remain in laid position without relative slippage and consequent lengthening of the rayon package during dyeing or finishing thereof mounted in superimposed relationship on said spindle having the interior thereof rigidly abutting said ribs to permit the passage of liquor from said axial channels radially through the perforations thereof, plates centrally perforated to be slidably mounted on said ribs having surfaces for the abutment of the adjacent ends of the perforated tubes thereon and spaced slots extending radially outwardly from said central perforations for receiving said ribs for securing said plates against rotation to separate the yarn packages mounted on said tubes and means to axially compress said plates and tubes to provide a rigid structure with said ribs abutting the slots in said plate means and the ends of said tubes abutting the surfaces of said plate means.

ALBERT JAEGER.
EDWARD M. TRINDER.